H. R. FITZGERALD AND H. H. WALTON.
LOCOMOTIVE HEADLIGHT CONTROL.
APPLICATION FILED JUNE 10, 1919.

1,333,205.

Patented Mar. 9, 1920.
2 SHEETS—SHEET 1.

INVENTORS.
H. R. Fitzgerald.
H. H. Walton.
by Lacey & Lacey,
Attys.

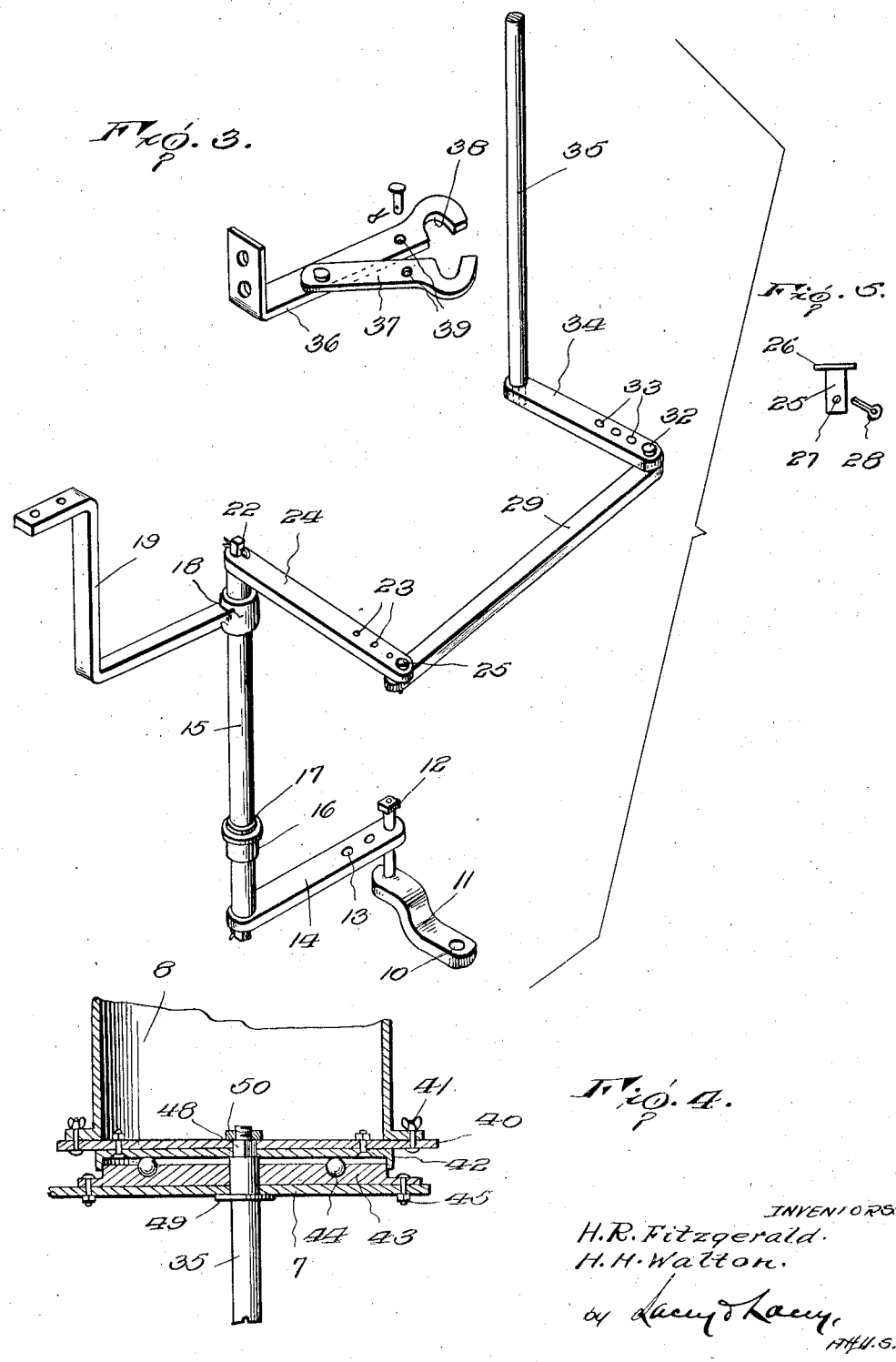

UNITED STATES PATENT OFFICE.

HARRY R. FITZGERALD AND HARRY H. WALTON, OF MEMPHIS, TENNESSEE.

LOCOMOTIVE-HEADLIGHT CONTROL.

1,333,205.  Specification of Letters Patent.  Patented Mar. 9, 1920.

Application filed June 10, 1919. Serial No. 303,090.

*To all whom it may concern:*

Be it known that we, HARRY R. FITZGERALD and HARRY H. WALTON, citizens of the United States, residing at Memphis, in the county of Shelby and State of Tennessee, have invented certain new and useful Improvements in Locomotive - Headlight Controls, of which the following is a specification.

This invention relates to dirigible headlights such as those carried by a railway locomotive, and the object of the same is to turn the headlight from side to side automatically by the lateral swinging movements of the pony truck so that when the locomotive reaches a curve the beam of light from the headlight will be immediately deflected accordingly.

The invention consists of a shaft automatically oscillated by the lateral swing of said truck, and connections between said shaft and a rotary table which supports the headlight; or more specifically, the invention includes a second shaft attached to said table, and working connections between the shafts so that a limited oscillation of the first or primary shaft by the swing of the truck is imparted in an increased degree to the secondary or lamp-table shaft, and thereby a small movement of the truck is amplified into a considerable movement of the headlight.

In the detailed construction and arrangement of parts to adapt them to the standard make of locomotive so that the structure can be readily applied thereto, consideration has been given to the relative vibration between the truck and the engine frame, and the invention includes means for permitting such vibration. Also, means are present for adjusting the degree to which the table-shaft is turned. Finally, means are also present for disconnecting this shaft from the remainder of the mechanism so that the boiler head can be removed as is so often necessary.

Details of the preferred embodiment of this invention are set forth below, and reference is made to the drawings wherein:

Fig. 3 is a general perspective view of all parts of the mechanism except the lamp-table and its support.

Fig. 4 is a sectional detail showing the connection of the secondary shaft with the lamp-table.

Fig. 5 is a detail of a pin and its cotter.

Figure 1:
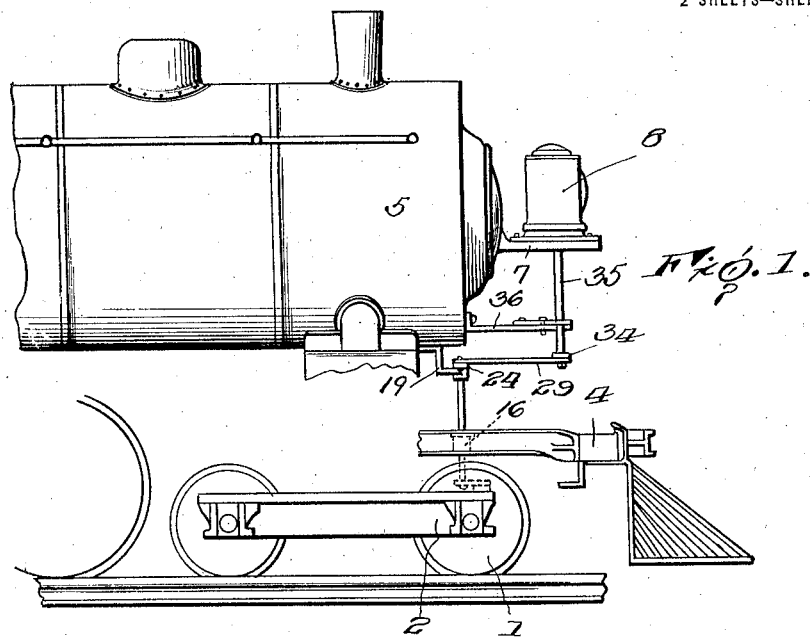
Figure 1 is an elevation of the forward portion of the standard type of locomotive, with this invention applied.
Figure 2:
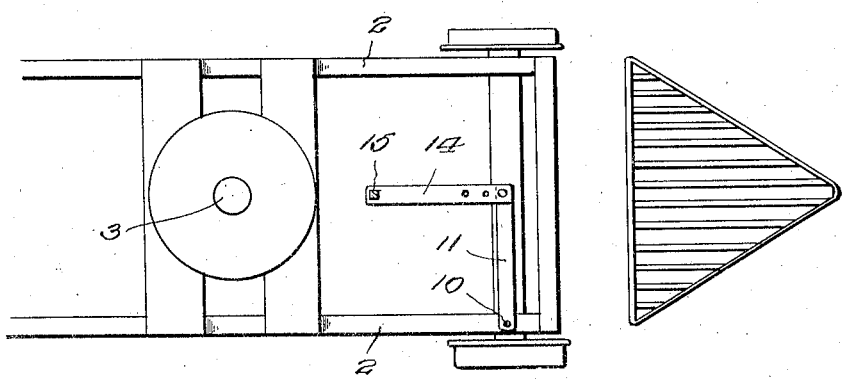
Fig. 2 is a diagram giving a plan view of the pony truck and showing the connection of this structure therewith.

The standard type of locomotive known as "Erie K-4" is illustrated in outline herein, but we are concerned only with the front wheels 1 of the pony truck 2 pivotally mounted by the cradle pin 3 beneath the engine frame 4, the latter supporting the boiler 5 having a removable head 6 carrying the usual platform 7 and upon which the headlight 8 is ordinarily fastened. To the parts as thus described and outlined this invention is to be applied in the form of an attachment.

Attached at 10 to the truck 2 is a strap 11 preferably upbent slightly as seen in Fig. 3, and its inner higher end carries a long upright pin 12 adapted to pass loosely through one of a series of holes 13 in what might be called the actuating crank 14 at the lower end of the primary shaft 15 from which said crank leads forward so that it stands usually directly over the transverse center of the truck. Said shaft extends upward through a bushing 16 in the engine frame 4, above which bushing the shaft has a collar 17; and near its upper end the shaft is mounted in a bearing 18 carried by a bracket 19 which is attached to the locomotive at a suitable point as perhaps beneath its boiler.

The primary shaft is double-cranked, and by preference its ends are squared and the cranks applied to the squared portions and pinned. Its uppermost or driving crank 24 is shown so pinned on the upper end at 22. This crank is by preference longer than the actuating crank 14 and has a series of holes 23 greater in number for a purpose yet to appear. Into one of these holes is dropped a pin 25 having a head 26 at its upper end and a perforation 27 through its body near its lower end so that a fastening device or key such as a cotter 28 may be passed therethrough. The pin also passes through a hole at the rear end of a link 29 which is thus pivoted to the crank 24 at the desired distance from its center of movement which is the primary shaft 15.

A secondary or lamp shaft 35 has a driven crank 34 projecting laterally from its lower end and provided with holes 33 through one of which is passed another pin 32 pivotally connecting the front end of the link 29 to this crank at the desired distance from its center of movement. The shaft 35 passes upward through a split bearing of appropriate form and from which it may be removed as described below. As herein shown, this bearing consists of a bracket 36 to which is pivoted an arm 37, the bracket and arm having notches 38 adapted to coact and inclose the shaft when these members overlie each other, and said members are provided with holes 39 which aline at that time for the insertion of a fastening device which may well be a pin and its key as described above.

The headlight 8 may be detachably mounted upon a table 40 by any appropriate means such as are shown at 41 in Fig. 4. Said table in turn is secured to the upper element 42 of a ball bearing whereof 43 indicates the lower element and 44 the balls, and the lower element is shown as bolted at 45 upon the platform 7. The secondary shaft 35 passes up through all these parts and is squared at 48 near its upper end and reduced and threaded above the squared portion to receive a nut 50, the shaft itself by preference having a collar 49 as shown to prevent vibration causing the headlight and the table and the upper element 42 to become dislodged from the lower element 43. However, it is quite possible to support the headlight for oscillation on the platform by other appropriate means.

When the truck 2 is swung to one side beneath the frame 4, the strap 11 moves the front end of the actuating crank 14 and turns the primary shaft in its bearings; this moves the driving crank 24 forward or backward, and link 29 conveys the movement to the driven crank 34 to a degree which is increased by the relative length of these cranks; the movement of the driven crank turns the secondary shaft 35, and the upper end of the shaft through the table 40 turns the headlight toward that side to which the track curves. Vibration of the truck 2 with respect to the frame 4 is permitted because the long pin 12 may rise and fall through the hole 13 which it engages. The relative degree of oscillation imparted to the secondary shaft may be varied by altering the point of connection between the link and the driving crank 24, and this is obviously done by setting the pivot pin in the desired hole 23. When it becomes necessary to remove the boiler head, the pin 32 is removed from the driven crank 34 which is, therefore, entirely freed from the remainder of the structure, and the split bearing is opened so that its shaft is also freed therefrom, and now the boiler head can be swung if it be hinged or can be removed entirely, and the headlight and its entire support, together with the shaft 35 and its crank 34 come off with the boiler head as will be clear.

Having described the invention, what is claimed as new is:

In a headlight control for application to a locomotive having a removable boiler head and a platform projecting rigidly from said head, the combination with a table overlying the platform and adapted to support the headlight, bearings between the table and platform, and a shaft depending rigidly from the table; of a bracket mounted rigidly on the boiler beneath its removable head and having a split bearing detachably embracing said shaft, and working connections between the shaft and the pony truck whereby swing of the latter is converted into oscillation of the shaft.

In testimony whereof we affix our signatures.

HARRY R. FITZGERALD.
HARRY H. WALTON.